United States Patent
Lundén

(10) Patent No.: US 8,812,187 B2
(45) Date of Patent: Aug. 19, 2014

(54) ARRANGEMENT AND METHOD FOR DETECTING FAILURE OF AN ELECTROMECHANICAL BRAKE

(75) Inventor: Mats Lundén, Svaärtinge (SE)

(73) Assignee: BT Products AB (SE)

( * ) Notice: Subject to any disclaimer, the term of this patent is extended or adjusted under 35 U.S.C. 154(b) by 63 days.

(21) Appl. No.: 13/160,683

(22) Filed: Jun. 15, 2011

(65) Prior Publication Data

US 2011/0313612 A1  Dec. 22, 2011

(30) Foreign Application Priority Data

Jun. 18, 2010 (SE) ...................................... 1050636

(51) Int. Cl.
*G01M 17/00* (2006.01)

(52) U.S. Cl.
USPC ........................................................ 701/29.1

(58) Field of Classification Search
CPC ....... B60T 7/042; B60T 17/22; G06C 5/0808; B60W 50/0205
USPC ........................................ 701/29.1, 29.9, 22
See application file for complete search history.

(56) References Cited

U.S. PATENT DOCUMENTS

| | | | |
|---|---|---|---|
| 6,008,604 A | 12/1999 | Maisch | |
| 6,158,822 A | 12/2000 | Shirai et al. | |
| 6,651,494 B1 * | 11/2003 | Herterich et al. | ............... 73/130 |
| 2006/0163939 A1 * | 7/2006 | Kuramochi et al. | ..... 303/122.04 |
| 2007/0114843 A1 * | 5/2007 | Kawahara et al. | ............ 303/122 |
| 2009/0107740 A1 * | 4/2009 | Bell et al. | ..................... 180/65.1 |
| 2012/0221184 A1 * | 8/2012 | Pfohl et al. | ...................... 701/22 |

FOREIGN PATENT DOCUMENTS

| | | | |
|---|---|---|---|
| EP | 0 924 128 A1 | 6/1999 | |
| EP | 1 253 056 A2 | 10/2002 | |
| EP | 1710549 | * 10/2006 | ............... G01L 5/28 |
| WO | 97/03869 | 2/1997 | |

* cited by examiner

*Primary Examiner* — James Trammell
*Assistant Examiner* — Michael D Lang
(74) *Attorney, Agent, or Firm* — Quarles & Brady LLP

(57) ABSTRACT

The invention relates to an arrangement and method for detecting failure of an electromechanical brake in an electromechanical drive system. The arrangement being characterized in that it comprises a control unit arranged to: send a drive torque signal to an electrical traction motor in the electromechanical drive system while the electromechanical brake is in an active braking position, detect if said applied drive torque causes a driving movement in the electrical traction motor, and indicate a mechanical failure of the electromechanical brake in case a driving movement in the electrical traction motor is caused by said applied drive torque. The invention further relates to a method for detecting failure of an electromechanical brake in an electromechanical drive system, and an industrial truck comprising the arrangement.

12 Claims, 4 Drawing Sheets

ARRANGEMENT AND METHOD FOR DETECTING FAILURE OF AN ELECTROMECHANICAL BRAKE

CROSS-REFERENCE TO RELATED APPLICATIONS

The present application claims the benefit of Swedish Patent Application No. 1050636-8 filed Jun. 18, 2010, which is fully incorporated herein by reference.

TECHNICAL FIELD

The invention relates in general to electromechanical brakes, and in particular to an arrangement and method for detecting failure of an electromechanical brake and an industrial truck comprising such an arrangement.

BACKGROUND

EP 0 840 683 discloses a method of diagnosing an electrically operated brake which includes an electric motor as a drive source for the electrically operated brake. According to this method, a quantity relating to the output of the electric motor is detected upon operation of the electrically operated brake, and the electrically operated brake is determined to be abnormal or defective if the detected quantity does not accurately correspond to the magnitude of a drive signal applied to the electric motor. However, this conventional diagnosing method permits a diagnosis of the electrically operated brake only when the brake is operated during running of the motor vehicle. In other words, the method does not permit a diagnosis of the electrically operated brake before running of the motor vehicle.

In EP 0 924 128, a method is provided for diagnosing an electrically operated brake in an automotive vehicle for abnormality, without or before operation of the electrically operated brake to brake the running vehicle. The electrically operated brake brakes the wheel by applying a friction force, where the friction force is generated by an electric motor of the electrically operated brake. The friction force of the electric motor of the electrically operated brake is applied upon an operation of a brake member. The method includes applying a checking signal to the electric motor of the electrically operated brake while the brake member is placed in a non-braking position. If a signal not normally corresponding to the checking signal is detected, an abnormality of the electrically operated brake is deemed to have been detected.

However, for certain type of vehicles other types of brake systems may often be employed. One example is industrial trucks which normally comprises electromechanical brake systems. In such electromechanical brake systems, an electromechanical brake normally applies a brake force directly onto the drive shaft of an electrical traction motor used to propel and drive the industrial truck. The brake force is applied by the electromechanical brake to the drive shaft using springs, and is released using inductive coils and magnetism. Today, while it is possible to provide a control function in order to check whether or not the electrical circuitry of such electromechanical brakes are operating properly, no solutions are known so far for checking the mechanical integrity and function of electromechanical brakes. Understandably, having properly functioning brakes is an absolute requirement for manually operated vehicles, and is therefore a highly prioritized safety issue.

SUMMARY

It is understood by the inventor that it is desirable to increase the safety in detecting failure of an electromechanical brake.

This problem is addressed by an arrangement for detecting failure of an electromechanical brake in an electromechanical drive system. The electromechanical brake system is characterized in that it comprises a control unit arranged to: send a drive torque signal to an electrical traction motor in the electromechanical drive system while the electromechanical brake is in an active braking position, detect if said applied drive torque causes a driving movement in the electrical traction motor, and indicate a mechanical failure of the electromechanical brake in case a driving movement in the electrical traction motor is caused by said applied drive torque.

By applying a suitable drive torque to the electrical traction motor while the electromechanical brake is in an active braking position and monitoring in case the electrical traction motor shaft starts to rotate in spite of the electromechanical brake being in an active braking position, the detection of several different mechanical failures in the electromechanical brake is enabled. An illustrative example is when the presence of foreign objects or particles may be physically blocking the operation of the electromechanical brake. This may impede the application of the brake force, which may cause the electrical traction motor shaft to begin to rotate in spite of the electromechanical brake being in an active braking position. This rotation may then be detected by the control unit and cause the control unit to indicate a mechanical failure of the electromechanical brake. Thereby, the safety of the electromechanical brake system is improved.

The electromechanical brake in the arrangement may be connected to a drive shaft at the opposite end of the electrical traction motor from where the electrical traction motor is connected to a traction gear box which mechanically transfers driving movement in the electrical traction motor to a drive wheel.

A movement detection sensor may be communicatively connected to the control unit, and be arranged to be used in detecting if said applied drive torque causes a driving movement in the electrical traction motor. Alternatively, the detection may also be performed by a control method in the control unit using mathematical models arranged to estimate various states and parameters describing what is going on in the electrical traction motor.

The control unit in the arrangement may further be arranged to check if the electromechanical brake is in an active braking position prior to applying the drive torque in the electrical traction motor. The control unit and the movement detection sensor in the arrangement may further be arranged to operate upon start up and/or shut down of the electromechanical drive system. These features may provide further safety by guaranteeing that the vehicle is parked or started in a safe manner, while at the same time ensuring that the mechanical integrity and function of the electromechanical brake is checked at these occasions.

The object of the present invention is further achieved by a method for detecting failure of an electromechanical brake in an electromechanical drive system. The method is characterized by comprising the steps of: applying a drive torque in an electrical traction motor in the electromechanical drive system while the electromechanical brake is in a active braking position; detecting if said applied drive torque causes a driving movement in the electrical traction motor; and indicating a mechanical failure of the electromechanical brake in case said applied drive torque causes a driving movement in the electrical traction motor in the electromechanical drive system.

The object of the present invention is further achieved by an industrial truck comprising an arrangement according to the above.

Further advantageous embodiments of the method are set forth in the dependent claims and correspond to the advantageous embodiments already set forth with reference to the previously mentioned arrangement.

BRIEF DESCRIPTION OF THE DRAWINGS

The objects, advantages and effects as well as features of the invention will be more readily understood from the following detailed description of exemplary embodiments of the invention when read together with the accompanying drawings, in which.

DETAILED DESCRIPTION

Figure 1:
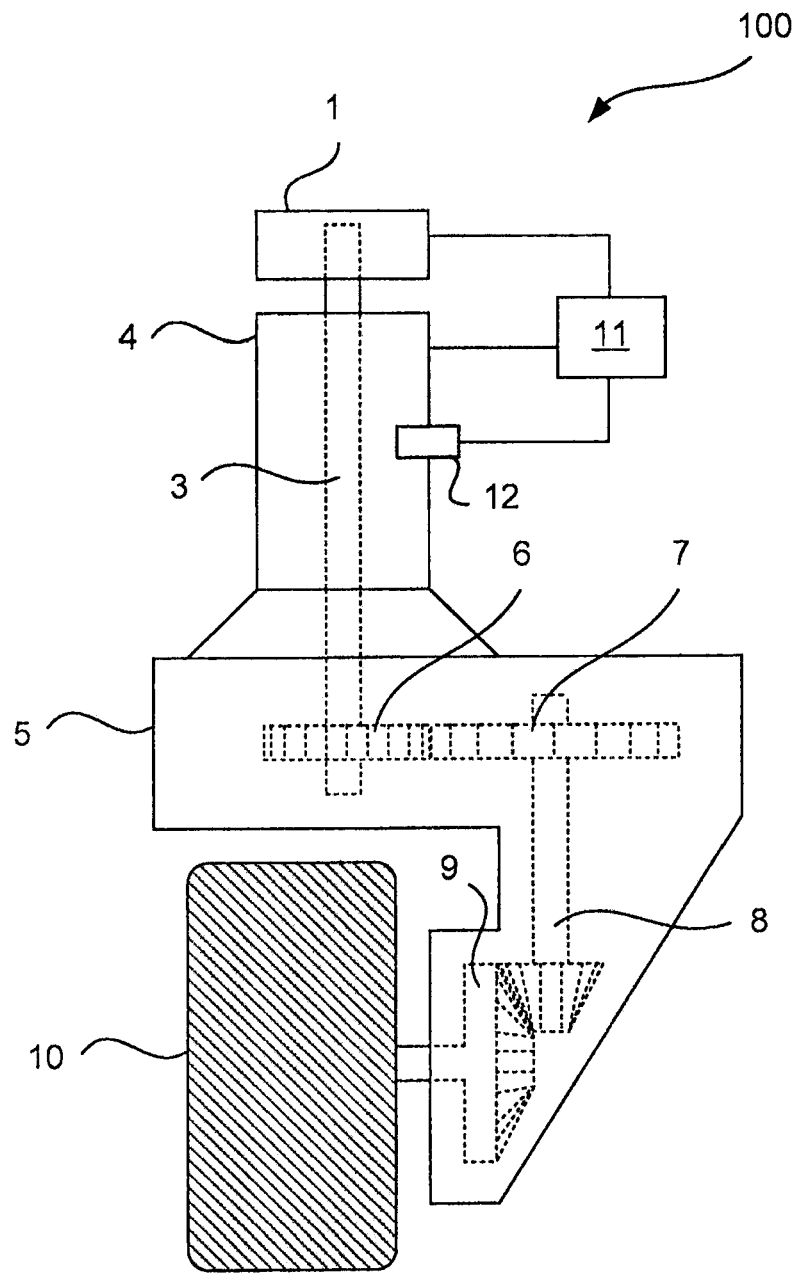
FIG. 1 illustrates an example of an arrangement comprising an electromechanical brake in an electromechanical drive system according to an embodiment of the invention.

FIG. 1 shows an electromechanical drive system 100 comprising an arrangement which comprises an electromechanical brake 1 according to an embodiment of the invention. The arrangement comprising the electromechanical brake 1 may hereinafter also be referred to as an electromechanical brake system.

The electromechanical brake system is arranged at one end of an electrical traction motor 4 and connected to a motor or drive shaft 3 which is used to propel and drive the drive wheel 10. The electromechanical brake system comprises an electromechanical brake 1 configured to apply a brake force directly onto the drive shaft 3 of the electrical traction motor 4. The electromechanical brake 1 may use mechanical springs and coils in order to apply or release the brake force directly onto/from the drive shaft 3. An example of an electromechanical brake 1 is shown in and described in relation to FIG. 2 below.

At the opposite end of the electrical traction motor 4 and receiving the other end of the drive shaft 3, is a traction gear box 5. The traction gear box 5 may comprise a first helical gear 6 being connected to the drive shaft 3 of the electrical traction motor 4. The first helical gear 6 may in turn be arranged to engage a second helical gear 7 in the traction gear box 5. The second helical gear 7 may be connected to the shaft of a pinion gear 8. The pinion gear 8 may in turn be arranged to engage a crown gear 9 in the traction gear box 5. The shaft of the crown gear 9 may in turn be connected to the drive wheel 10. The traction gear box 5 illustrates an example of how the drive shaft 3 of the electrical traction motor 4 may be operatively connected to and drive the drive wheel 10.

According to an embodiment of the invention, the electromechanical brake system also comprises a control unit 11 and a movement detection sensor 12. The control unit 11 may be communicatively connected to the electromechanical brake 1, the electrical traction motor 4 and the movement detection sensor 12. The control unit 11 may further be connected to or comprised in the general electrical system (not shown) of the vehicle comprising the electromechanical drive system 100, e.g. an industrial truck. An industrial truck typically comprises a fork lift which the industrial truck may use in lifting and transporting different loads.

It should be noted that control unit 11 may be a dedicated computational unit, a computer processing unit (CPU) or similar unit arranged to perform dedicated tasks. The control unit 11 may be provided as one physical unit, or alternatively as a plurality of logically interconnected units, and may be comprised in or form a part of the general electrical system in the vehicle comprising the electromechanical drive system 100. The control unit 11 may also comprise processing means or logic for performing the functionality of the electromechanical brake system according to this embodiment of the invention. This functionality may be implemented partly by means of a software or computer program. The control unit 11 may also comprise storage means or a memory unit for storing such a computer program and processing means or a processing unit, such as a microprocessor, for executing the stored computer program. The storage means may be a readable storage medium, but a memory storage unit separated from, but connected to the control unit 11. When, in the following, it is described that the control unit 11 performs a certain function or operation it is to be understood that the control unit 11 may use the processing means or logic to execute a certain part of the program which is stored in the storage means.

Upon start up or shut down of the electromechanical drive system 100, the control unit 11 may be configured to determine whether or not the electromechanical brake 1 is in an active braking position, i.e. if the electromechanical brake 1 is set to directly apply a brake force onto the drive shaft 3 of the electrical traction motor 4. In case the electromechanical brake 1 is in the active braking position, the control unit 11 may be configured to send a drive torque signal to the electrical traction motor 4. For example, the drive torque signal may indicate to the electrical traction motor 4 to apply a torque corresponding to 50-70% of the maximum torque that may be produced by the electrical traction motor 4.

The movement detection sensor 12 may be configured to detect a driving movement in the electrical traction motor 4, e.g. a rotational movement of the drive shaft 3. The movement detection sensor 12 may be any type of suitable motion or speed sensor capable of detecting the driving movement of the electrical traction motor 4. The movement detection sensor 12 may also be arranged to interact with an object or item arranged on, for example, the drive shaft 3, in order to facilitate an easy detection of the driving movement in the electrical traction motor 4.

Upon detecting a driving movement in the electrical traction motor 4 by the movement detection sensor 12, while the drive torque is applied by the electrical traction motor 4, the control unit 11 may be configured to indicate a mechanical failure of the electromechanical brake 1. This may be performed by, for example, sending a signal to the general electrical system of the vehicle comprising the electromechanical drive system 100, or to an alarm function, such as, a warning light and/or sound generating device (not shown) in the vehicle comprising the electromechanical drive system 100.

According to another embodiment, the movement detection sensor 12 may be replaced by a control method in the control unit 11 which is arranged to estimate various states and parameters describing what is going on in the electrical traction motor 4. The control method in the control unit 11 may use mathematical models which describe the electrical traction motor 4 and its function. From the mathematical models, the control method may, for example, calculate an estimate state of the electrical traction motor 4, which may provide reference or desired control values in the form of currents to the electrical traction motor 4. The control method may be arranged to detecting a driving movement in the electrical traction motor 4, while the drive torque is applied by the electrical traction motor 4 and the electromechanical brake 1 is in an active braking position.

Figure 2:
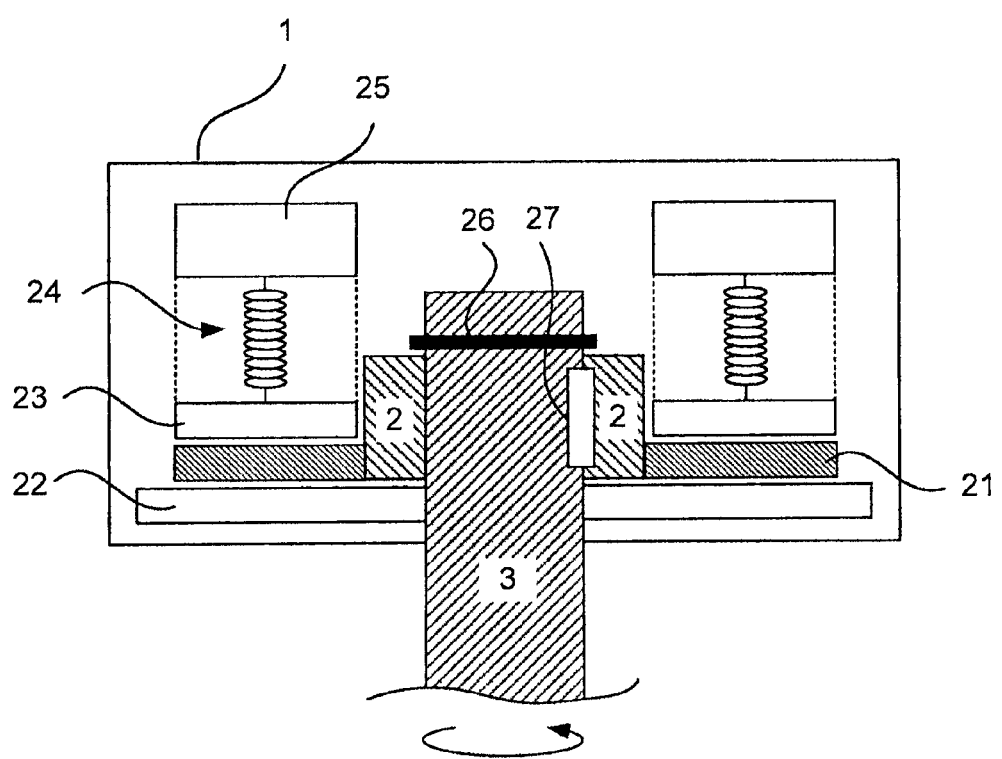
FIG. 2 illustrates an example of an electromechanical brake.

FIG. 2 shows an example of an electromechanical brake 1. In the electromechanical brake 1, a brake hub 2 is arranged onto the drive shaft 3 of the electrical traction motor 4. The brake hub 2 may be connected to the drive shaft 3 via a key 27. Thus, the brake hub 2 is arranged to rotate along with the drive shaft 3. A snap-ring 26 may be fixed to the drive shaft 3 in order to keep the brake hub 2 from sliding up and off the drive shaft 3 in case of failure in the attachment of the brake hub 2 to the drive shaft 3, e.g. due to a mechanical failure of the key 27 or key tracks.

A friction disc 21 is arranged to the brake hub 2 via a spline interface. Thus, the friction disc 21 rotates along with the brake hub 2 and the drive shaft 3. The friction disc 21 is often comprised of a bearer of the friction material and the friction material. The bearer may be comprised of a plastic or aluminum composite, and the friction material may be glued to the bearer.

Assuming that no mechanical failure is present in the electromechanical brake 1, a brake force may be transferred to the drive shaft 3 via the friction disc 21 and the brake hub 2. The brake force may be applied to the friction disc 21 by having a brake plate 23 applying a force onto the friction disc 21. The force applied by the brake plate 23 will cause a friction force between the rotating friction disc 21 and the brake plate 23, as well as, a friction force between the rotating friction disc 21 and a bottom plate 22. In this manner, a brake force may be transferred to the drive shaft 3.

The brake plate 23 may be arranged to one or several springs 24. As a current flow through a coil (not shown) in the electromagnetic housing 25, a magnetic circuit may be closed by having the brake plate 23 being drawn towards the electromagnetic housing 25 by a magnetic force arranged to overcome the force of the spring or springs 24. In this case, no force will be applied by the brake plate 23 onto the friction disc 21 and the friction disc will be free to rotate along with the brake hub 2 and the drive shaft 3, i.e. the electromechanical brake 1 will not be in an active braking position. However, as a current is not flowing through the coil in the electromagnetic housing 25, the magnetic circuit will not close and the force of the spring or springs 24 will act onto the brake plate 23 causing the brake plate 23 to apply a force onto the friction disc 21. Thus, a force will be applied by the brake plate 23 onto the friction disc 21 and the friction disc will be subjected to the friction forces which translate into a brake force being applied to the drive shaft 3, i.e. the electromechanical brake 1 will be in an active braking position.

By applying a suitable drive torque to the electrical traction motor 4 while the electromechanical brake 1 is in an active braking position and monitoring in case the electrical traction motor or drive shaft 3 starts to rotate in spite of the electromechanical brake 1 being in an active braking position, the detection of several different mechanical failures in the electromechanical brake 1 is enabled. Examples of different mechanical failures that may be detected by the embodiments of the invention are listed below:

In case the key 27 or key tracks of the key 27 fail, the drive shaft 3 will rotate, while the brake hub 2 may remain still or rotate uncontrollably. Thus, no brake force may be applied by the electromechanical brake 1 to the drive shaft 3 of the electrical traction motor 4.

In case the transfer between the brake hub 2 and the friction disc 21 fail, e.g. failure in the spline interface, no brake force may be applied by the electromechanical brake 1 to the drive shaft 3 of the electrical traction motor 4.

In case wrong friction material has been applied onto the bearer of the friction disc 21, or a too small amount of friction material has been applied onto the bearer of the friction disc 21, or the friction material has been contaminated or loosened, the friction forces applied to the friction disc 21 may be too low and the electromechanical brake 1 may thus not be able to provide the expected proper brake force to the drive shaft 3.

In case the wrong type of spring or springs 24 has been mounted in the electromechanical brake 1, or a stress or fatigue failure occur in the spring or springs 24, or the wrong number of springs are used, the force applied to the brake plate 23 by the spring or springs 24 may be too low, whereby the friction forces applied to the friction disc 21 may be too low and the electromechanical brake 1 may thus not be able to provide the expected proper brake force to the drive shaft 3.

In case a foreign object or particle gets lodged between the brake plate 23 and the bottom plate 22 and interfers with or prevents the spring or springs 24 from pressing the brake plate 23 onto the friction disc 21, the electromechanical brake 1 may not be able to provide the expected proper brake force to the drive shaft 3.

It should be noted that these are just a few examples of mechanical failures that may occur in the electromechanical brake 1 and does not provide an exhaustive list of mechanical failures detectable by the embodiments of the invention. As described above, any one of these failures may thus impede the application of the brake force from the spring or springs 24, which may cause the electrical traction motor or drive shaft 3 to begin to rotate in spite of the electromechanical brake 1 being in an active braking position. Accordingly, this rotation may be detected as described in the embodiments of the invention in relation to FIG. 1, and cause a mechanical failure of the electromechanical brake to be indicated to an operator by the electromechanical brake system. Thereby, the safety of the electromechanical brake system is thus improved.

Figure 3:
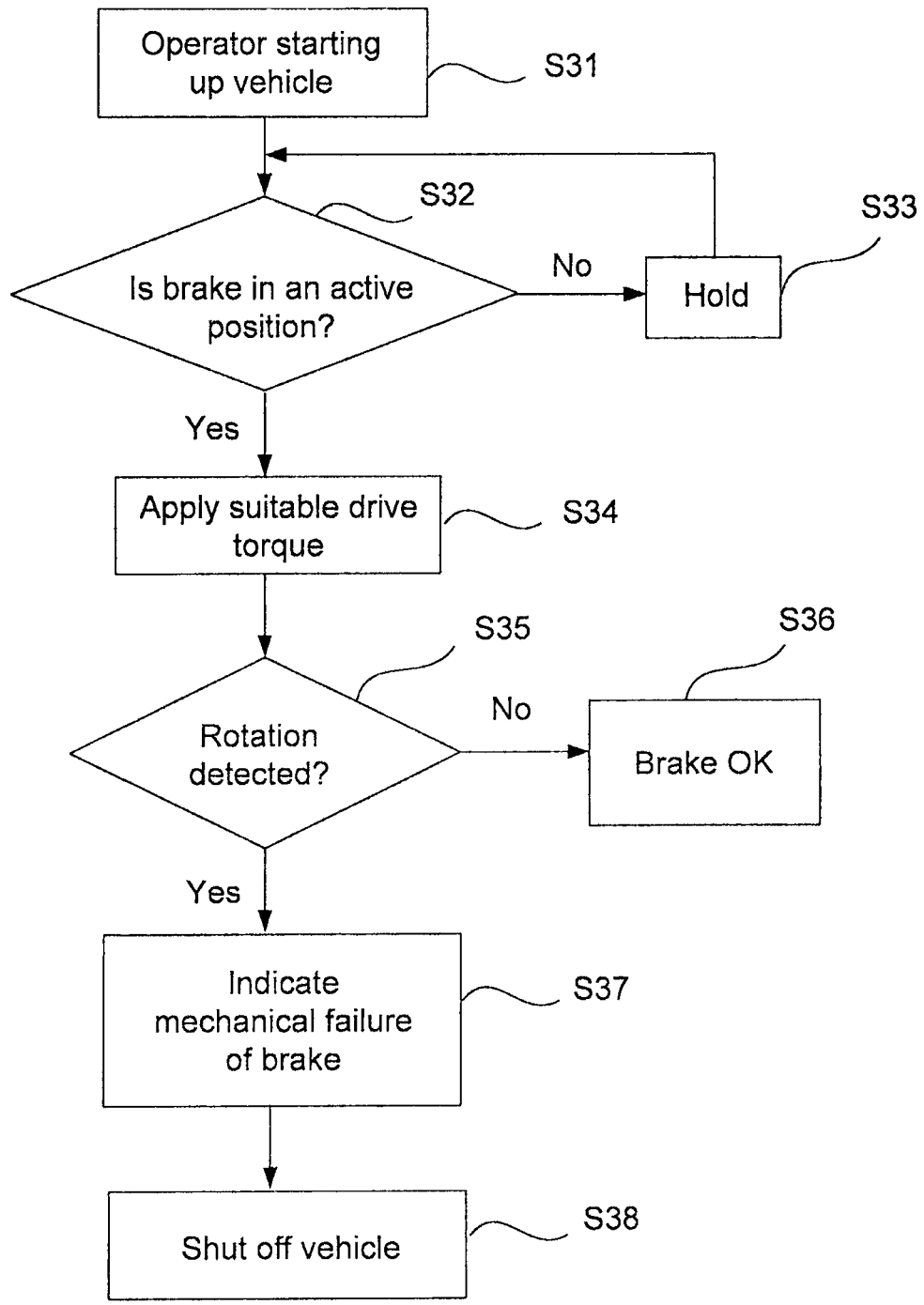
FIG. 3 shows a flowchart of a method for use in an arrangement comprising an electromechanical brake according to an embodiment of the invention.

FIG. 3 shows a flowchart of a method for use in an arrangement comprising an electromechanical brake, i.e. an electromechanical brake system, according to an embodiment of the invention.

In step S31, an operator of a vehicle comprising the electromechanical drive system 100, e.g. a fork lift vehicle or an industrial truck, may initiate a start up of the vehicle and the electromechanical drive system 100. This may be performed by the operator by, for example, turning a key, presenting an electronic key, or entering a PIN code, etc.

In step S32, the control unit 11 may then determine whether or not the electromechanical brake 1 is set in an active braking position. In step S33, if the electromechanical brake 1 is not set in an active braking position, the control unit 11 may be configured to hold off starting the vehicle until the electromechanical brake 1 is set in an active braking position. Alternatively, the control unit 11 may be configured to alert the operator of that the electromechanical brake 1 is not set in an active braking position and that the electromechanical brake system therefore can not be checked for possible mechanical failures.

In step S34, if the electromechanical brake 1 is set in an active braking position, the control unit 11 may be configured to cause the electrical traction motor 4 to apply a suitable amount of drive torque to the motor shaft 3. The amount of torque applied may depend on the particular type of electromechanical brake system, the vehicle type, or on other implementation specific factors, etc. For example, the amount of torque may be 70% of the maximum torque that may be produced by the electrical traction motor 4.

In step S35, the control unit 11 may be configured to detect whether or nor the applied torque causes a driving movement in the electrical traction motor 4 by being in communication with the movement detection sensor 12. The movement detection sensor 12 may indicate to the control unit 11 if it detects a driving moment in the electrical traction motor 4, e.g. a rotational movement of the drive shaft 3.

In step S36, if no driving movement in the electrical traction motor 4 is detected by the movement detection sensor 12 for a predetermined period of time during which the drive torque was applied, the mechanical integrity of the electromechanical brake 1 in the electromechanical brake system may be considered intact and fully functioning. However, in step S37, if a driving movement in the electrical traction motor 4 is detected by the movement detection sensor 12 for the predetermined period of time during which the drive torque was applied, the control unit 11 may indicate to the operator that the mechanical integrity of the electromechanical brake 1 in the electromechanical brake system may be compromised and comprise a mechanical failure. Alternatively, in step S38, the control unit 11 may thus cause the vehicle to be shut off, since the vehicle may not be safe to operate by the operator.

Figure 4:
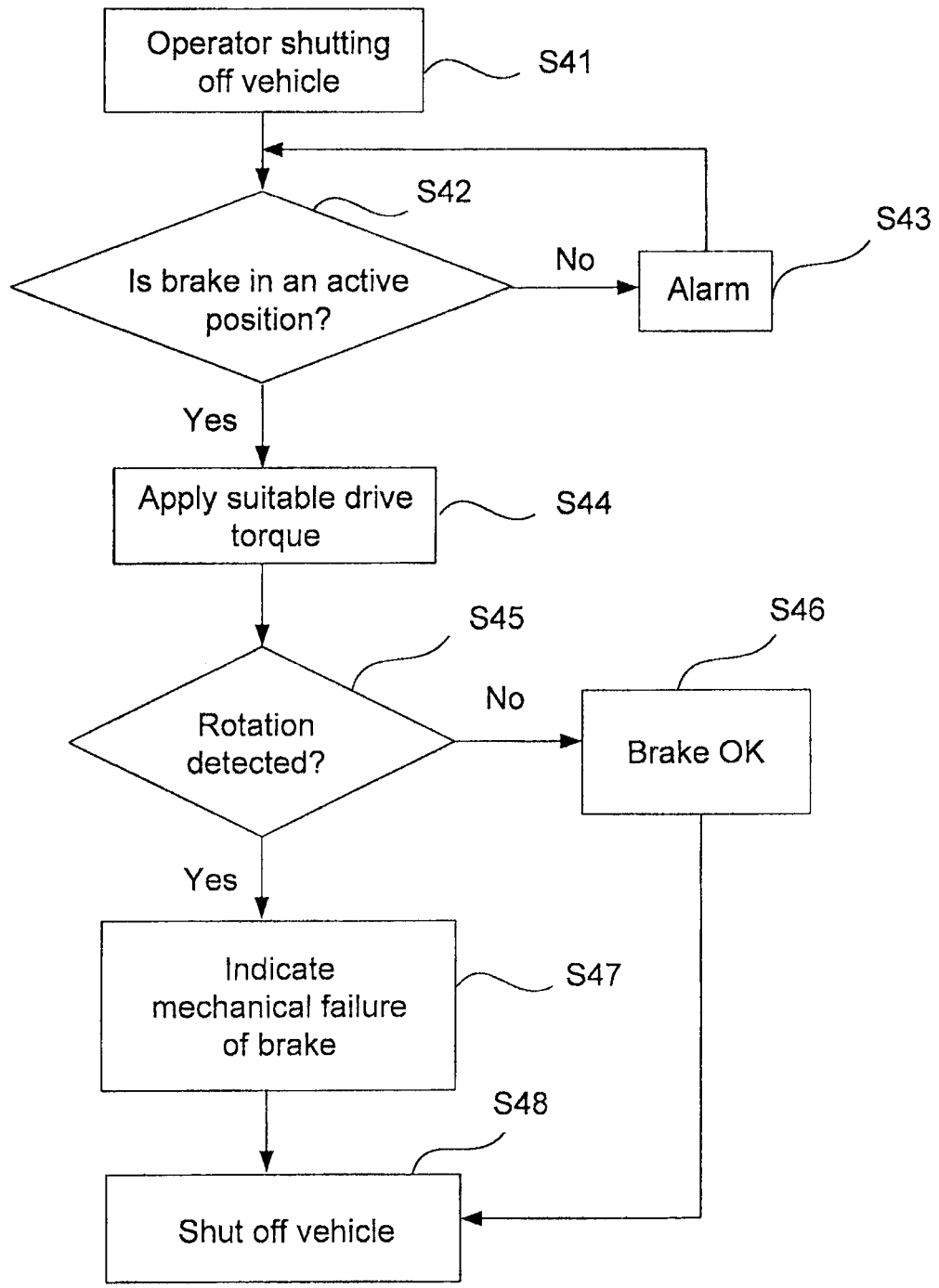
FIG. 4 shows a flowchart of a method for use in an arrangement comprising an electromechanical brake according to a further embodiment of the invention.

FIG. 4 shows a flowchart of a method for use in an arrangement comprising an electromechanical brake, i.e. an electromechanical brake system, according to a further embodiment of the invention.

In step S41, an operator of a vehicle comprising the electromechanical drive system 100, e.g. a fork lift vehicle or an industrial truck, may attempt to shut off the vehicle and the electromechanical drive system 100, or attempt to exit and leave the vehicle.

In step S42, the control unit 11 may then determine whether or not the electromechanical brake 1 is set in an active braking position. In step S43, if the electromechanical brake 1 is not set in an active braking position, the control unit 11 may be configured to alert the operator of that the electromechanical brake 1 is not set in an active braking position, for example, by triggering an alarm and/or a warning light.

In step S44, if the electromechanical brake 1 is set in an active braking position, the control unit 11 may be configured to cause the electrical traction motor 4 to apply a suitable amount of drive torque to the motor shaft 3. In step S45, the control unit 11 may be configured to detect whether or nor the applied torque causes a driving movement in the electrical traction motor 4 by being in communication with the movement detection sensor 12. The movement detection sensor 12 may indicate to the control unit 11 if it detects a driving moment in the electrical traction motor 4, e.g. a rotational movement of the drive shaft 3.

In step S46, if no driving movement in the electrical traction motor 4 is detected by the movement detection sensor 12 for a predetermined period of time during which the drive torque was applied, the mechanical integrity of the electromechanical brake 1 in the electromechanical brake system may be considered intact and fully functioning. Thus, in step S48, the vehicle may be shut off without any further actions.

However, in step S47, if a driving movement in the electrical traction motor 4 is detected by the movement detection sensor 12 for the predetermined period of time during which the drive torque was applied, the control unit 11 may indicate to the operator that the mechanical integrity of the electromechanical brake 1 in the electromechanical brake system may be compromised and comprise a mechanical failure. It should be noted that although, in step S48, the control unit 11 may only be configured to cause the vehicle to be shut off, there are numerous additional safety actions that the control unit 11 may be set to invoke, for example, triggering an emergency brake, keep triggering an alarm even though the vehicle has been shut off, etc. It should also be noted that the methods described in FIGS. 3 and 4 may also be adapted to cooperate with a control method in the control unit 11 in a similar manner as with the motion detection sensor 12 described above.

The invention claimed is:

1. An arrangement for detecting failure of an electromechanical brake in an electromechanical drive system of a vehicle, said arrangement comprising a control unit-arranged to:
    send a drive torque signal to an electrical traction motor in the electromechanical drive system while the electromechanical brake is in an active braking position,
    detect a driving movement in the electrical traction motor caused by said applied drive torque,
    indicate a mechanical failure of the electromechanical brake in case a driving movement in the electrical traction motor is caused by said applied drive torque by sending a signal to an alarm function, and
    shut off the vehicle upon indication of the mechanical failure of the electromechanical brake.

2. An arrangement according to claim 1, wherein the electromechanical brake is connected to a drive shaft at the opposite end of the electrical traction motor from where the electrical traction motor is connected to a traction gear box which mechanically transfers driving movement in the electrical traction motor to a drive wheel.

3. An arrangement according to claim 1, wherein said control unit is arranged to check if the electromechanical brake is in an active braking position prior to applying the drive torque in the electrical traction motor.

4. An arrangement according to any claim 1, wherein a movement detection sensor communicatively connected to the control unit is arranged to be used in detecting if said applied drive torque causes a driving movement in the electrical traction motor.

5. An arrangement according to any claim 1, wherein the control unit is arranged to operate upon start up and/or shut down of the electromechanical drive system.

6. A method for detecting failure of an electromechanical brake in an electromechanical drive system of a vehicle, said method comprising the steps of:
    applying a drive torque in an electrical traction motor in the electromechanical drive system while the electromechanical brake is in an active braking position by sending a drive torque signal from a control unit to the electrical traction motor of the electromechanical drive system;
    detecting a driving movement in the electrical traction motor caused by said applied drive torque using a movement detection sensor communicatively connected to the control unit;
    sending a signal from the control unit to an alarm function indicating a mechanical failure of the electromechanical brake upon detection of the driving movement in the electrical traction motor in the electromechanical drive system caused by said applied drive torque; and shutting off the vehicle in response to a signal from the control unit upon detection of the driving movement in the electrical traction motor of the electromechanical drive system caused by said applied drive torque.

7. A method according to claim 6, wherein the electromechanical brake is connected to a drive shaft at the opposite end of the electrical traction motor from where the electrical traction motor is connected to a traction gear box which mechanically transfers driving movement in the electrical traction motor to a drive wheel.

8. A method according to claim 6, further comprising the step of:
checking if the electromechanical brake is in an active braking position prior to applying the drive torque in the electrical traction motor.

9. A method according to claim 6, wherein the steps are performed upon start up and/or shut down of the electromechanical drive system.

10. An industrial truck comprising an arrangement according to claim 1, wherein the vehicle is the industrial truck.

11. An arrangement according to claim 1, in which said alarm function is at least one of a warning light and a sound generating device.

12. A method according to claim 6, in which said alarm function is at least one of a warning light and a sound generating device.

* * * * *